April 3, 1951 J. C. FERGUSON 2,546,993

HIGH EFFICIENCY CLASS C AMPLIFIER

Filed Jan. 4, 1947 2 Sheets-Sheet 1

INVENTOR
JOSEPH C. FERGUSON

BY [signature]

ATTORNEY

INVENTOR
JOSEPH C. FERGUSON
BY [signature]
ATTORNEY

Patented Apr. 3, 1951

2,546,993

UNITED STATES PATENT OFFICE 2,546,993

HIGH EFFICIENCY CLASS C AMPLIFIER

Joseph C. Ferguson, Fort Wayne, Ind., assignor, by mesne assignments, to Farnsworth Research Corporation, a corporation of Indiana Application January 4, 1947, Serial No. 720,266

9 Claims. (Cl. 179—171)

This invention relates generally to amplifiers, and particularly pertains to a cathode ray tube arranged as a high efficiency class C amplifier.

It is conventional practice to provide a cathode ray tube with two targets or collector anodes and to deflect the electron beam developed in the tube across the two targets in accordance with an input signal. The targets may be connected in push-pull across an inductance or a tuned circuit to develop an output signal. Although a conventional cathode ray tube arranged for deflection moduation may be utilized as a class C amplifier, the efficiency of the tube is low because the electron current can be utilized only for a small fraction of the time. On the other hand, if the targets are arranged in such a manner that the beam impacts the targets during a major portion of the deflection cycle, the thermal losses increase, because most of the electron current is collected at a high voltage.

Recently cathode ray tubes have been developed which permit passage of an electron current of the order of one ampere. Hence, a cathode ray tube may be utilized as a power amplifier in which case class C operation is desirable in view of the high efficiency obtained thereby.

It is an object of the present invention, therefore, to provide a cathode ray tube arranged as a high efficiency class C amplifier.

A further object of the invention is to provide a cathode ray tube wherein the energy represented by the current of the electron beam is utilized substantially continuously during each cycle of operation for developing class C output pulses.

In accordance with the present invention there is provided a high efficiency class C amplifier including a cathode ray tube which comprises a plurality of targets. There are provided means for developing an electron beam and directing it toward the targets and means for cyclically deflecting the beam in a closed path across each target in succession. Finally means are provided including an output circuit for adding the impulses derived from each target during one deflection cycle of the beam with such a time delay that all of these impulses occur in the output circuit substantially simultaneously. In this manner the current represented by the electron beam is utilized substantially continuosuly.

For a better understanding of the invention, together with other and further objects thereof, reference is made to the following description, taken in connection with the accompanying drawings, and its scope will be pointed out in the appended claims.

Figure 1:
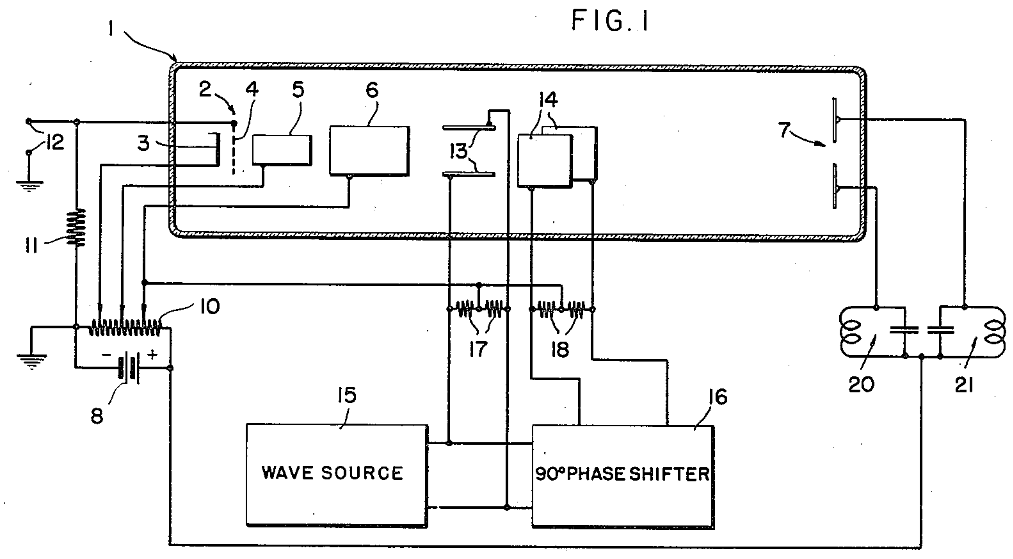
Fig. 1 illustrates a cathode ray tube arranged as a class C amplifier and embodying the present invention.

Referring now to the drawings, in which like components are designated by the same reference numerals throughout the figures and particularly to Fig. 1, there is provided cathode ray tube 1 which is arranged as a high efficiency class C amplifier. Cathode ray tube 1 comprises electron gun 2 which may include cathode 3, control grid 4, first anode 5 and second anode 6. Electron gun 2 is arranged for developing an electron beam and directing it toward targets 7, only two of which are shown in Fig. 1.

For the purpose of applying operating potentials to electron gun 2 these is provided a suitable potential source such as battery 8 having its terminals connected across voltage divider 10. The negative terminal of battery 8 may be grounded as shown. By means of suitable taps on voltage divider 10 the electrodes of electron gun 2 are supplied with operating potentials. Control grid 4 may be connected to ground through grid leak resistor 11, and an input signal may be impressed upon input terminals 12 for modulating the intensity of the electron beam.

The electron beam developed by electron gun 2 is deflected across targets 7 in a substantially circular path. To this end there are provided deflecting plates 13 and 14. Deflecting plates 13 are connected to wave source 15 which develops a sinusoidal wave such as a carrier wave. Deflecting plates 14 are connected to wave source 15 through 90 degrees phase shifter 16 so that the waves impressed upon deflecting plates 13 and 14 are in phase quadrature. The leads connecting deflecting plates 13 and 14 with wave source 15 and phase shifter 16, respectively, may be short circuited by resistors 17 and 18, respectively, having their center points connected to second anode 6 so that the average potential of the deflecting plates equals that of second anode 6. The electrostatic fields developed by the waves impressed upon deflecting plates 13 and 14 will cause the electron beam to rotate in a circular path across targets 7. Targets 7 are connected to the positive terminal of battery 8 through tuned circuits 20 and 21.

Figure 2:
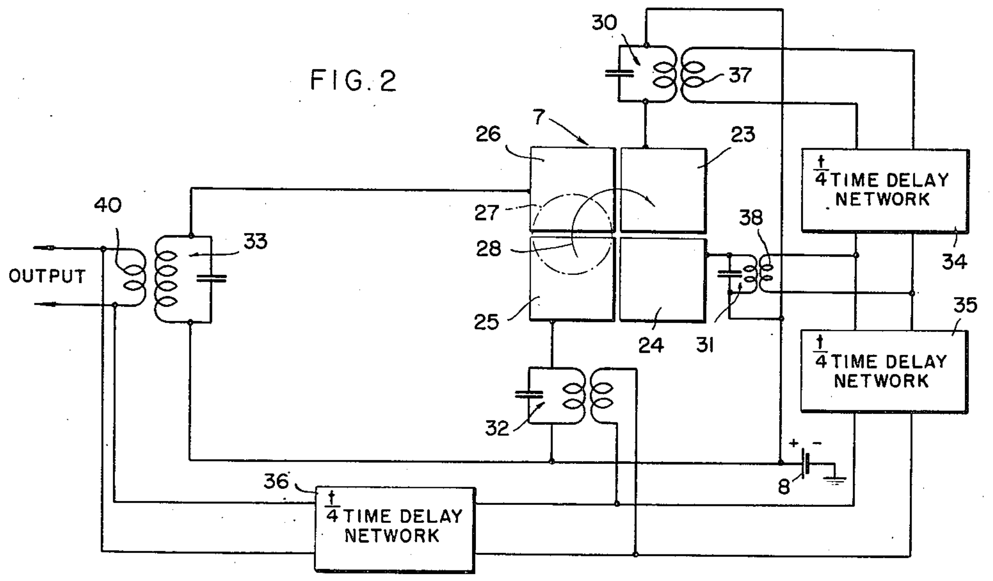
Fig. 2 is a plan view of four targets which may be provided in the tube of Fig. 1 and their associated circuits arranged to add the pulses derived by the impact of the electron beam with the targets in such a manner that they occur at the same instant.

The number of targets 7 of cathode ray tube 1 preferably equals three or more. Referring now to Fig. 2, there are illustrated four targets 23, 24, 25 and 26 which may be provided in cathode ray tube 1 and which are disposed about a circle. The electron beam which impacts targets 7, that is, targets 23 to 26 is indicated at 27. The electron beam is deflected across targets 23 to 26 in succession in a circular path indicated by arrow 28. The electron beam need only be roughly focused, and in some cases focusing may not be necessary as long as the cross section of electron beam 27 is not appreciably larger than one of the targets 23 to 26. Every time the electron beam impacts one of the targets, an impulse may be derived from the target. The number of impulses obtained during a deflection cycle of the beam is, of course, equal to the number of targets.

In accordance with the present invention these impulses are added with such a time delay that all impulses occur at the same instant in the output circuit. Thus, cathode ray tube 1 may be operated in the manner of a class C amplifier. The operating angle of the tube is equal to 360 electrical degrees divided by the number of targets. Therefore, if cathode ray tube 1 is provided with four targets as illustrated in Fig. 2, the operating angle of the tube amounts to 90 degrees. If, for example, three or six targets are provided, the operating angle of the tube amounts to 120 or 60 degrees, respectively. Since the efficiency of a class C amplifier increases as the operating angle decreases, it is preferred to provide at least three targets and preferably four.

Targets 23, 24, 25 and 26 are respectively connected to resonant circuits 30, 31, 32 and 33 which, in turn, are returned to the positive pole of battery 8 to supply the targets with a suitable steady voltage. Resonant circuits 30 to 33 of Fig. 2 correspond to tuned circuits 20 and 21 of Fig. 1. The impulses derived from targets 23 to 26 upon impact of the electron beam therewith are converted into sinusoidal waves in tuned circuits 30 to 33, as is well known. The sinusoidal waves developed in tuned circuits 30 to 33 are now added in phase.

To this end there are provided time delay networks 34, 35 and 36. Each time delay network 34, 35 and 36 is arranged to impart a time delay of $t/4$ to a wave or impulse passing therethrough where $t$ is the time required for the electron beam to be deflected once across all targets 23 to 26. Expressed in another way, time delay networks 34, 35 and 36 may be considered as phase shifters which will shift the phase of the input wave through 90 degrees.

Time delay network 34 has its input coupled to tuned circuit 30 through inductor 37. The output wave of time delay network 34 is connected to the input circuit of time delay network 35 which is further coupled through coil 38 to tuned circuit 31. Similarly, the output of time delay network 35 is impressed upon time delay network 36 as well as the wave developed in tuned circuit 32. Output circuit 40 is connected to the output of time delay network 36 and is furthermore coupled to tuned circuit 33 as illustrated.

The operation of the circuit illustrated in Fig. 2 will now be evident. Let it be assumed that the cathode ray beam impacts at first target 23 whereby an impulse may be derived from target 23. This impulse is converted in tuned circuit 30 into a first sinusoidal wave which is impressed upon time delay network 34. After a time corresponding to $t/4$, a second impulse is derived from target 24 which is converted in tuned circuit 31 into a second sinusoidal wave which in turn is impressed upon the next time delay network, that is, network 35. Accordingly, the two waves impressed upon the network 35 from network 34 and from tuned circuit 31 are in phase. When the electron beam impacts target 25, a third impulse is derived which in turn is converted into a sinusoidal wave impressed upon network 36 in phase with the output wave of network 35. The electron beam is finally deflected upon target 26 to develop a fourth sinusoidal wave in tuned circuit 33. The output wave obtained from network 36 is in phase with the wave developed in tuned circuit 33.

It will accordingly be seen that time delay networks 34, 35 and 36 are connected in cascade so that the first sinusoidal wave developed in tuned circuit 30 is delayed three times through 90 degrees, while the second wave developed in tuned circuit 31 is delayed twice and the third wave developed in tuned circuit 32 is delayed once by the same amount corresponding to $t/4$. The four waves are accordingly added in phase in output circuit 40. The current represented by the electron beam is utilized substantially continuously except for the negligible losses occasioned by the spaces between the four targets 23 to 26.

Figure 3:
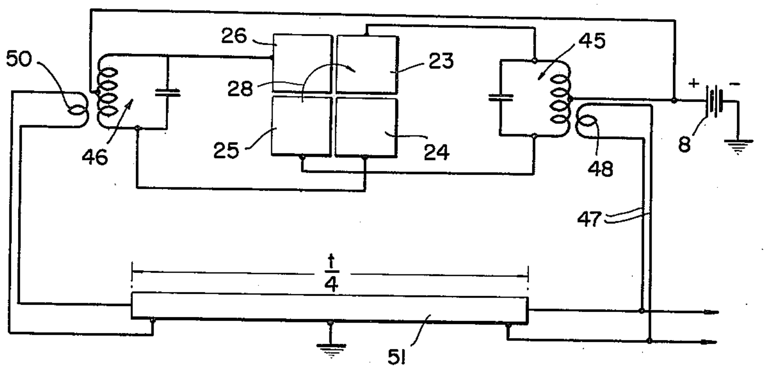
Fig. 3 is a plan view similar to Fig. 2 and illustrating four targets and a modified circuit coupled thereto adapted for adding two sinusoidal waves in phase.

A modified circuit in accordance with the invention is illustrated in Fig. 3. Four targets 23 to 26 are shown which may be identical with the targets illustrated in Fig. 2. The four targets 23 to 26 may be considered to be arranged in pairs, the two targets of each pair being disposed opposite to each other with respect to the circle indicated by arrow 28 through which the electron beam is deflected. The first pair of targets, that is, targets 23 and 25 is connected across resonant circuit 45 while the second pair of targets, that is, targets 24 and 26 is connected across resonant circuit 46. The mid points of the inductors of resonant circuits 45 and 46 are connected to the positive terminal of battery 8 for applying operating potentials to the targets.

Each pair of targets, that is, targets 23, 25 and targets 24, 26 is accordingly connected in phase opposition to resonant circuits 45 and 46, respectively. Resonant circuit 45 may be coupled to output circuit 47 through inductor 48. Resonant circuit 46 is coupled to output circuit 47 through inductor 50 which in turn is connected to transmission line 51 which may be a coaxial cable as illustrated. As indicated in Fig. 3, the length of coaxial cable 51 is such as to introduce a time delay of $t/4$. The output waves developed in resonant circuits 45 and 46 are therefore added in phase in output circuit 47. It will be obvious that the time delay or phase shift between the sinusoidal waves developed in resonant circuits 45 and 46 amounts to 90 degrees. It is to be understood that coaxial cable 51 may be replaced by any other suitable phase shift or time delay means which will introduce a phase shift of 90 degrees or a time delay of $t/4$.

Figure 4:
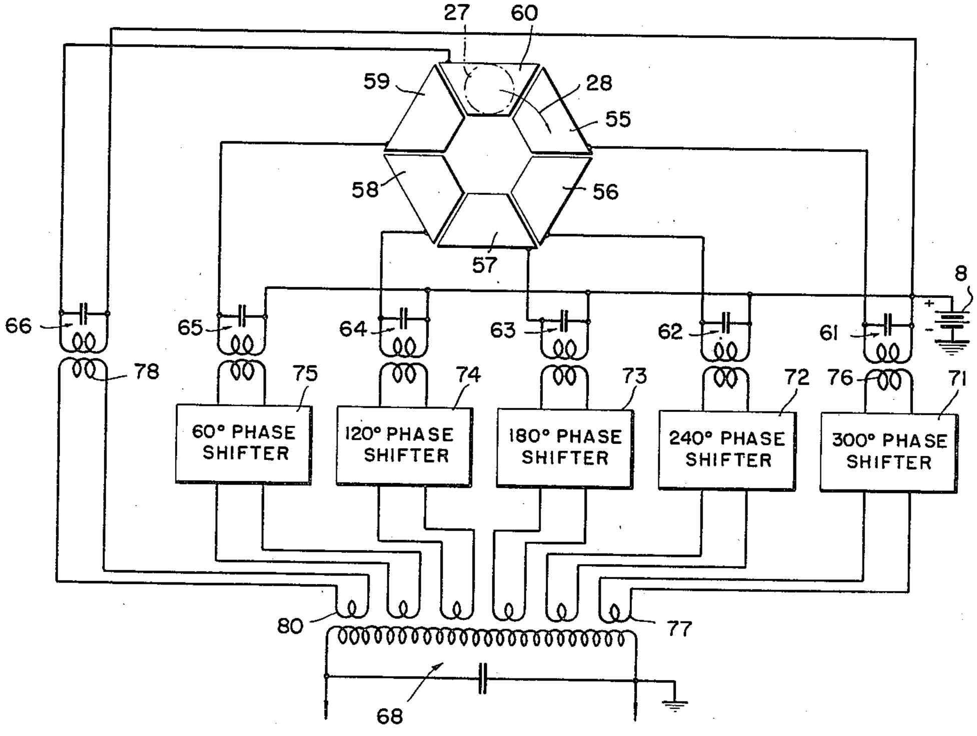
Fig. 4 is a plan view of six targets which may be provided in a cathode ray tube and their associated circuits in accordance with the invention.

Referring now to Fig. 4, there is illustrated another modification of the invention, including six targets 55, 56, 57, 58, 59 and 60 which may be substituted for targets 7 in cathode ray tube 1. The electron beam indicated at 27 may be deflected in a direction indicated by arrow 28. Targets 55 to 60 are connected, respectively, to resonant circuits 61, 62, 63, 64, 65 and 66 which are returned to the positive terminal of battery 8. Resonant circuits 61 to 66 are coupled to output circuit 68 in such a manner that the sinusoidal waves developed in circuits 61 to 66 are added in phase. Output circuit 68 has been illustrated as a resonant circuit, but it is to be understood that its condenser may be omitted provided the impedance of the load is properly matched to that of output circuit 68.

For the purpose of adding the waves developed in resonant circuits 61 to 66 in proper phase there are provided phase shifters 71, 72, 73, 74 and 75. The input of phase shifter 71 is coupled to resonant circuit 61 through inductor 76, while its output is coupled to output circuit 68 through inductor 77. Phase shifter 72 to 75 are similarly coupled, on the one hand, to resonant circuits 62 to 65, respectively, and to output circuit 68, on the other hand. Resonant circuit 66 may be coupled to output circuit 68 either directly or through a coupling link including inductors 78 and 80 as illustrated.

Let it be assumed that electron beam 27 impacts at first target 55. The sinusoidal wave which is consequently developed in resonant circuit 61 is impressed upon output circuit 68 with a phase shift of 300 degrees through phase shifter 71. Similarly, the waves developed in resonant circuits 62 to 65 upon impact of the electron beam will be impressed upon output circuit 68 with a phase shift of 240 degrees, 180 degrees, 120 degrees and 60 degrees, respectively, through phase shifters 72 to 75. The wave developed in resonant circuit 66 is impressed upon output circuit 68 without phase shift. It will accordingly be seen that all the sinousoidal waves developed in resonant circuits 61 to 66 are impressed on output circuit 68 in phase.

The six targets 55 to 60 shown in Fig. 4 may be connected across resonant circuits in pairs disposed opposite to each other with respect to the circle through which the electron beam is deflected in the manner illustrated in Fig. 3. The waves developed in the three resonant circuits coupled to the six targets 55 to 60 may be added in phase in an output circuit by suitable phase shifters. Thus, the wave developed in the resonant circuit coupled to targets 55 and 58 may be shifted through 120 degrees, while the wave developed in the resonant circuit connected across targets 56 and 59 may be shifted through 60 degrees. The two phase shifted waves may then be added to the wave developed in the resonant circuit connected across targets 57 and 60.

The circuit of Fig. 2 has the advantage that time delay networks or phase shifters 34 to 36 are all arranged to have the same time delay or phase shift. In the circuit of Fig. 4 each phase shifter is adapted to provide a different phase shift. On the other hand, the current flowing through time delay networks 35 and 36 of the circuit of Fig. 2 is considerably larger than that flowing through time delay network 34 for which proper provision must be made.

The amplifier of the present invention may be utilized in the same manner as a conventional class C amplifier and for the same purposes. Since cathode ray tubes have been designed to develop an electron current of the order of one ampere, the cathode ray tube of the invention may be used as a power amplifier. Modulation of the carrier wave developed by cathode ray tube 1 may, for example, be effected by modulating the beam intensity in accordance with an input signal in the manner illustrated in Fig. 1. It is to be understood that any conventional method of modulating the output wave of a class C amplifier may be utilized for obtaining a modulated carrier wave.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high efficiency class C amplifier including a cathode ray tube comprising a plurality of targets, means for developing an electron beam and directing it toward said targets, means including a signal input circuit for controlling said beam, means for cyclically deflecting said beam in a closed path across each of said targets in succession, a plurality of resonant circuits respectively coupled to said targets, an output circuit coupled to each of said resonant circuits, and a plurality of delay means coupled intermediate said resonant circuits and said output circuit and adjusted in delay time to provide additive time relationship of the impulses derived from each of said targets during one deflection cycle of said beam whereby a current in said output circuit equal to the combined outputs of said resonant circuits is developed.

2. A high efficiency class C amplifier including a cathode ray tube comprising at least three targets arranged in a closed path, means for developing an electron beam and directing it towards said targets, means including a signal input circuit for controlling said beam, means for cyclically deflecting said beam across each of said targets in succession, a plurality of resonant circuits respectively coupled to said targets, an output circuit coupled to each of said resonant circuits, and a plurality of delay means coupled intermediate said resonant circuits and said output circuit and adjusted in delay time to provide additive time relationship of the impulses derived from each of said targets during one deflection cycle of said beam whereby a current in said output circuit equal to the combined outputs of said resonant circuits is developed.

3. A high efficiency class C amplifier including a cathode ray tube comprising a plurality of targets, means for developing an electron beam and directing it toward said targets, means including a signal input circuit for controlling said beam, means for deflecting said beam in a substantially circular path across each of said targets in succession, a plurality of resonant circuits respectively coupled to said targets, an output circuit coupled to each of said resonant circuits, and a plurality of delay means coupled intermediate said resonant circuits and said output circuit and adjusted in delay time to provide additive time relationship of the impulses derived from each of said targets during one deflection cycle of said beam whereby a current in said output circuit equal to the combined outputs of said resonant circuits is developed.

4. A high efficiency class C amplifier including a cathode ray tube comprising at least three targets, means for developing an electron beam and directing it toward said targets, means including a signal input circuit for controlling said beam, means for cyclically deflecting said beam in a closed path across each of said targets in succession, a plurality of resonant circuits respectively coupled to said targets, an output circuit coupled to each of said resonant circuits, and a plurality of delay means coupled intermediate said resonant circuits and said output circuit and adjusted in delay time to provide additive time relationship of the impulses derived from each of said targets during one deflection cycle of said beam whereby there is developed an output wave in said output circuit at a frequency equal to the deflection frequency of said beam.

5. A high efficiency class C amplifier including a cathode ray tube comprising a plurality of targets, means for developing an electron beam and directing it toward said targets, means including a signal input circuit for controlling said beam, means for deflecting said beam in a substantially circular path across each of said targets in succession, a plurality of resonant circuits respectively coupled to said targets, an output circuit coupled to each of said resonant circuits, and a plurality of delay means coupled intermediate said resonant circuits and said output circuit and adjusted in delay time to provide additive time relationship of the impulses derived from each of said targets during one deflection cycle of said beam whereby there is developed an output wave in said output circuit at a frequency equal to the deflection frequency of said beam.

6. A high efficiency class C amplifier including a cathode ray tube comprising a plurality of targets, means for developing an electron beam and directing it toward said targets, means including a signal input circuit for controlling said beam, means for deflecting said beam in a substantially circular path across each of said targets in succession, a plurality of resonant circuits respectively coupled to said targets, an output circuit to each of said resonant circuits, and a plurality of phase shifters coupled intermediate said resonant circuits and said output circuit and adjusted to shift the phase of the impulses derived from each of said targets, to provide additive time relationship of said impulses during one deflection cycle of said beam whereby an output wave is developed in said output circuit at a frequency equal to the deflection frequency of said beam.

7. A high efficiency class C amplifier including a cathode ray tube comprising a plurality of targets, means for developing an electron beam and directing it toward said targets, means including a signal input circuit for controlling said beam, means for deflecting said beam in a substantially circular path across each of said targets in succession, a plurality of resonant circuits respectively coupled to said targets, an output circuit, and a plurality of phase shifters, one coupled in cascade intermediate every two of said resonant circuits which are coupled to adjacent of said targets, the output of one of said phase shifters being coupled to said output circuit, said phase shifters adjusted in delay time to provide additive time relationship of the impulses derived from each of said targets during one deflection cycle of said beam whereby there is developed an output wave in said output circuit at a frequency equal to the deflection frequency of said beam.

8. A high efficiency class C amplifier including a cathode ray tube comprising pairs of targets disposed substantially about a circle, the two targets of each of said pairs of targets being disposed opposite each other with respect to said circle, means for developing an electron beam and directing it toward said targets, means including a signal input circuit for controlling said beam, means for deflecting said beam across each of said targets in succession, a plurality of resonant circuits respectively coupled to said targets, an output circuit, and phase shifting means coupled intermediate said resonant circuits and said output circuit and adjusted to provide additive time relationship of the impulses derived from each of said targets during one deflection cycle of said beam whereby there is developed an output current in said output circuit equal to the combined outputs of said resonant circuits.

9. A high efficiency class C amplifier including a cathode ray tube comprising pairs of targets disposed substantially about a circle, the two targets of each of said pairs of targets being disposed opposite each other with respect to said circle, means for developing an electron beam and directing it toward said targets, means including a signal input circuit for controlling said beam, means for deflecting said beam across each of said targets in succession, a plurality of resonant circuits respectively coupled to said targets, an output circuit, and resonant transmission line means coupled between said resonant circuits and said output circuit for providing additive time relationship of the impulses derived from each pair of targets during one deflection cycle of said beam whereby there is developed a current in said output circuit equal to the combined outputs of said resonant circuits.

JOSEPH C. FERGUSON.

REFERENCES CITED

The following references are of record in the file of this patent:

UNITED STATES PATENTS

| Number | Name | Date |
|---|---|---|
| 1,999,884 | Salzberg | Apr. 30, 1935 |
| 2,177,256 | Ives | Oct. 24, 1939 |
| 2,257,795 | Gray | Oct. 7, 1941 |
| 2,174,194 | Farnsworth | Feb. 24, 1942 |